8589X
S. Chubbuck,
Making Cut Nails.
Patented Jan. 13, 1835.
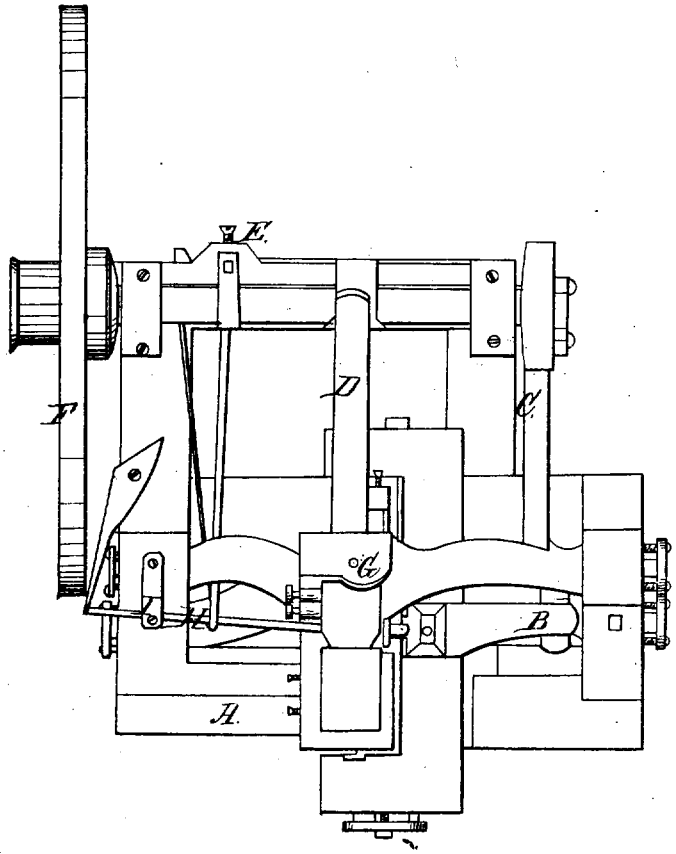
N. PETERS, PHOTO-LITHOGRAPHER, WASHINGTON, D. C.

Stephen Chubbuck. Wareham. Mass.

Letters Patent

The Schedule referred to in these Letters Patent and making part of the same
Containing a description in the words of the said Stephen Chubbuck
himself of his Improvement in that part of the "Rud nail Machine,
called the "nipper, which gives the nail a motion as it is taken from
the cutter.

"To all persons to whom these presents shall come. Stephen
Chubbuck of Wareham in the County of Plymouth and State of Mass
-achusetts Gentleman sends greeting.

Be it known that I the said Stephen
Chubbuck have invented constructed and applied to use a new and
useful improvement in that part of the "Reed Nail Machine, called the
Nipper specified in the words following viz. This Improvement consists
in having the "Nipper, to play upon a pin in the upright post through
which it passes, and is therefore called a joint Nipper which admits
of a vertical as well as a horizontal movement a desideratum
long sought for by those engaged in the business of making nails upon
the Machine aforesaid. The joint in the Nipper together with the
mode of applying a weight or spring to the short arm of the lever
to regulate its motion constitutes the improvement in which he
claims an exclusive property; & a reference to the different parts of
the machine will serve to illustrate the utility of the improve
-ment of which he claims the invention A is called the bed piece
B Heading Lever
C Cutting Lever
D Griping Lever
E Axle
F Balance Wheel
G Nipper Lever. H. The Nipper which passes through the upright post I and instead of being there confined
as formerly which admitted only of a horizontal movement it is al-
-lowed to play on a pin which makes a joint by means of which a ver-
-tical as well as a horizontal motion is produced. By this new and
improved arrangement it takes the nail from the cutter as it passes
down to be headed and instead of sliding it edgewise against the back
piece it strikes it in such a manner upon the edge as to give it the turn
of a quarter of a circle and then by its vertical motion catches it upon
the under side when it is griped flatwise & held fast to receive its
head This has been found by satisfactory experiment not only by him
-self but by others well acquainted with the business of making nails
by machinery to be a very valuable improvement on the machine
aforesaid it is capable also with its weight or springs to be applied
to other machines but whether with the same advantage as to the "Reed
Machine" he cannot say with the same degree of certainty as he has
not had an opportunity of putting it to the test. The general improve
-ment however in the nippers by which the combined motion as afore
-mentioned is produced that is by having it to play in the post, ma
-king thereby a joint and having its motion regulated by a weight
or spring attached to its shortest arm he claims as his invention
whether applied to "Reeds Nail Machine" or any other; and in this
he claims an exclusive property. In testimony that the above is a
true specification of my improvement as above described I have
hereunto set my hand this tenth day of July in the Year of our Lord
one thousand eight hundred and thirty four Witnesses
Nathaniel Lewis }
Thomas Perkins } Stephen Chubbuck Exd
W.H.C (Drawing)

[650 wds